(12) United States Patent
Harrison et al.

(10) Patent No.: US 9,122,990 B2
(45) Date of Patent: Sep. 1, 2015

(54) METHOD AND SYSTEM FOR MANAGEMENT OF SECURITY RULE SET

(71) Applicant: TUFIN SOFTWARE TECHNOLOGIES LTD., Ramat Gan (IL)

(72) Inventors: Reuven Harrison, Tel Aviv (IL); Amir Cogan, Herzliya (IL); Tomer Barkan, Alfei Menashe (IL)

(73) Assignee: TUFIN SOFTWARE TECHNOLOGIES LTD., Ramat Gan (IL)

( * ) Notice: Subject to any disclaimer, the term of this patent is extended or adjusted under 35 U.S.C. 154(b) by 130 days.

(21) Appl. No.: 13/899,103

(22) Filed: May 21, 2013

(65) Prior Publication Data

US 2013/0254150 A1      Sep. 26, 2013

Related U.S. Application Data

(60) Continuation of application No. 12/885,929, filed on Sep. 20, 2010, now Pat. No. 8,468,113, which is a division of application No. 12/781,352, filed on May 17, 2010, now Pat. No. 8,458,766.

(60) Provisional application No. 61/179,089, filed on May 18, 2009.

(51) Int. Cl.
  *G06N 5/02*     (2006.01)
  *G06F 21/60*    (2013.01)
  *H04L 29/06*    (2006.01)

(52) U.S. Cl.
  CPC ............. *G06N 5/02* (2013.01); *G06F 21/604* (2013.01); *H04L 63/20* (2013.01); *H04L 65/605* (2013.01)

(58) Field of Classification Search
  CPC ......... G06F 21/604; G06N 5/02; H04L 63/20
  See application file for complete search history.

(56) References Cited

U.S. PATENT DOCUMENTS

| | | | |
|---|---|---|---|
| 6,098,172 | A | 8/2000 | Coss et al. |
| 6,484,261 | B1 | 11/2002 | Wiegel |
| 6,826,698 | B1 | 11/2004 | Minkin et al. |
| 7,032,022 | B1 | 4/2006 | Shanumgam et al. |
| 2003/0212657 | A1 | 11/2003 | Kaluskar et al. |
| 2007/0094707 | A1 | 4/2007 | Karch |
| 2008/0172347 | A1 | 7/2008 | Bernoth et al. |
| 2008/0172731 | A1 | 7/2008 | Aaron |
| 2008/0215518 | A1 | 9/2008 | Matsuda |
| 2008/0282313 | A1 | 11/2008 | Diaz-Cuellar et al. |
| 2008/0282336 | A1 | 11/2008 | Diaz Cuellar et al. |
| 2010/0011433 | A1 | 1/2010 | Harrison et al. |

*Primary Examiner* — Stanley K Hill
(74) *Attorney, Agent, or Firm* — Oliff PLC

(57) ABSTRACT

There are provided a method of automated managing one or more security rule-sets and a system thereof. The method comprising: obtaining data characterizing a connectivity request and an amended rule-set, the amended rule-set being derivative of an initial rule-set amended to fit the connectivity request; automated verifying each possible combination of values in the connectivity request against the initial rule-set and the amended rule-set; calculating one or more values selected from a group comprising values characterizing relative amount of extra allowed traffic and values characterizing relative amount of dissatisfied requested traffic; automated comparing the calculated values and/or derivatives thereof with a predefined threshold; and automated classifying the amended rule-set as applicable for implementation if the results of the automated comparing match a predefined verification criterion.

10 Claims, 8 Drawing Sheets

Interface: From untrust To trust

Status: Verified

Threshold = 100%

Implementing rules

From untrust To trust, total policy: 2

| Number | Name | Source | Destination | Application | Action | Options |
|---|---|---|---|---|---|---|
| 2 | Host_Access_First | 10_network | Host_192.168.1.40 | junos-https | ⊘ | |
| 3 | new_Host_Access_First | 10_network | Host_192.168.1.41 | junos-https | ✓ | |

No violating rules

Interface: From untrust To trust

Status: Verified with threshold

Threshold = 94%

Implementing rules

From untrust To trust, total policy: 2

| Number | Name | Source | Destination | Application | Action | Options |
|---|---|---|---|---|---|---|
| 3 | Host_Access_First | 10_network | Host_192.168.1.40 | junos-https | ⊘ | |
| 4 | new_Host_Access_First | 10_network | Host_192.168.1.41 | junos-https | ✓ | |

Partially violating rules

From untrust To trust, total policy: 1

| Number | Name | Source | Destination | Application | Action | Options |
|---|---|---|---|---|---|---|
| 2 | partialBlock | 16hostsIn10Network | Host_192.168.1.40<br>Host_192.168.1.41 | junos-https | ✗ | |

Figure 5b

METHOD AND SYSTEM FOR MANAGEMENT OF SECURITY RULE SET

The present application is a continuation of U.S. patent application Ser. No. 12/885,929 filed on Sep. 20, 2010. The U.S. patent application Ser. No. 12/885,929 is a continuation-in-part of U.S. patent application Ser. No. 12/781,352 filed on May 17, 2010, which claims priority from U.S. Provisional Patent Application No. 61/179,089 filed on May 18, 2009. The entire contents of all applications are hereby incorporated herein by reference.

FIELD OF THE INVENTION

This invention generally relates to network security, and more particularly, to methods and systems capable of managing a security rule-set.

BACKGROUND OF THE INVENTION

Today, information security is one of the critical concerns in computer networks and services. Various methods have been developed for protection of various resources and services; usually these methods include implementation of one or more security policies, combinations and hierarchies thereof. Typically, a security policy implemented in a respective rule-set includes control of inbound and outbound traffic related to certain resources. Such control is enforced with the help of one or more security gateways, which may comprise various devices and/or combinations thereof (e.g. switches, routers, firewalls, VPN devices, load balancers, etc.).

However, maintaining the security rule-set, especially in complex network architecture, presents an increasing challenge to security departments worldwide. The problems of security rule-set management, including proposing amendments for current policy and/or verifying thereof, have been recognized in the Prior Art and various systems have been developed to provide a solution as, for example:

U.S. Pat. No. 6,098,172 (Coss et al.) discloses a firewall supporting multiple security policies and/or multiple users by applying any one of several distinct sets of access rules. The firewall can also be configured to utilize "stateful" packet filtering which involves caching rule processing results for one or more packets, and then utilizing the cached results to bypass rule processing for subsequent similar packets. Dynamic rules may be used in addition to pre-loaded access rules in order to simplify rule processing.

U.S. Pat. No. 6,826,698 (Minkin et al.) discloses a system, method and computer program product for affording network security features. The method includes: identifying a plurality of network objects; retrieving rule-sets associated with at least one of the identified network objects, the rule-sets including a plurality of policy rules that govern actions relating to the identified network objects; reconciling overlapping policy rules of the rule-sets amongst the network objects; and executing the reconciled rule-sets.

US Patent Application No. 2003/212657 (Lu et al.) discloses an extensible rules engine that uses database technology that provides a rules evaluation service for applications external to the database server or database management system. Applications are able to utilize the rules engine to provide alternative behaviors based on information against which specified conditions are evaluated. A framework is provided for specifying data definitions that can be referenced by user-defined rules, through creation and use of an evaluation context. Application-specific data types can be defined by specifying data tables and/or variables that can be referenced by rules created for evaluation against data that is associated with the evaluation context.

US Patent Application 2007/094707 (Karch) discloses a rules-based system enforcing security policies in a data access management system. The rules based system provides rules that preclude certain activities, but those rules are only implemented and fired upon certain conditions occurring. This results in certain actions being precluded when specified conditions are true, without additional software required to check for the condition each time the action is requested.

US Patent Application No. 2008/215518 (Matsuda) discloses a filtering rule analysis system for analyzing the rules of a packet filtering process that is set in network devices. The system includes: a rule storage for storing sets of rules for which an order of priority has been established; a matrix generator for generating matrix spatial data that contains information of the order of priority and that indicates the correspondence relation between a minimum region identified by starting points and end points of ranges of packet attributes described in each rule as the condition of application of that rule and those rules; and an overlap analyzer for referring to the matrix spatial data to analyze overlap between the rules.

US Patent Application No. 2008/282313 (Diez-Cuellar et al.) discloses a computer-readable medium having a data structure stored thereon for defining a schema for expressing a network security policy. The data structure includes a first data field including data defining a parameter to be applied based on the network security policy. The network security policy defines at least one of the following: a firewall rule and a connection security rule. The data structure also includes a second data field having data specifying restrictions of the parameter included in the first data field. The parameter in the first data field and the restrictions in the second data field form the schema for expressing the network security policy to be processed. The network security policy manages communications between a computing device and at least one other computing device.

US Patent Application No. 2010/011433 (Harrison et al.) discloses a rule-set generator and a method of automated configuration of a security gateway. The method comprises setting-up an initial rule-set; obtaining log records of communication events corresponding to the initial rule-set so as to obtain a sufficient amount of log records; transforming the obtained log records into respective rules, wherein source, destination and service fields in each rule correspond to source, destination and service values in respective obtained log record, and the action in all rules is defined as "Accept", thus giving rise to a transformation-based rule-set; and processing the transformation-based rule-set so as to generate an operable rule-set.

SUMMARY OF THE INVENTION

In accordance with certain aspects of the subject matter of the present application, there is provided a method of automated managing a security rule-set. The method comprises: obtaining data characterizing a connectivity request; automated recognizing all possible combinations of values in the connectivity request; automated verifying each combination of values in the connectivity request against a first rule-set; calculating one or more values characterizing relative amount of satisfied and dissatisfied combinations in the request; automated comparing the calculated values and/or derivatives thereof with a predefined threshold; and automated classifying the connectivity request in accordance with comparison results.

The method further comprises: amending the first rule-set, thus giving rise to a second rule set comprising extra allowed traffic resulting from the amended; automated verifying each combination of values in the connectivity request against the second rule-set; calculating one or more values selected from a group comprising values characterizing relative amount of extra allowed traffic and values characterizing relative amount of dissatisfied traffic in the connectivity request; automated comparing the calculated values and/or derivatives thereof with a predefined threshold; and automated classifying the second rule-set in accordance with comparison results.

The verification of the request may be provided with regard to the entire rule-set and/or with regard to one or more rules within the rule-set. The verification against the connectivity request may be provided for one or more certain rules in the second rule-set, thereby enabling considering possible side effects related to amending said certain rules.

In accordance with other aspects of the subject matter of the present application, there is provided a system capable of automated managing a security rule-set, the system comprises: an interface operable to obtain data characterizing a connectivity request; means for automated recognizing all possible combinations of values in the connectivity request; means for automated verifying each combination of values in the connectivity request against a first rule-set; means for automated calculating one or more values characterizing relative amount of satisfied and dissatisfied combinations in the request; means for automated comparing the calculated values and/or derivatives thereof with a predefined threshold; and means for automated classifying the connectivity request in accordance with comparison results.

The system further comprises: means for obtaining a second rule-set comprising extra allowed traffic resulting from the amending the first rule-set; means for automated verifying each combination of values in the connectivity request against the second rule-set; means for automated calculating one or more values selected from a group comprising values characterizing relative amount of extra allowed traffic and values characterizing relative amount of dissatisfied traffic in the connectivity request; means for automated comparing the calculated values and/or derivatives thereof with a predefined threshold; and means for automated classifying the second rule-set in accordance with comparison results.

In accordance with other aspects of the subject matter of the present application, there is provided a method of automated managing two or more security rule-sets, the method comprising: obtaining data characterizing a first rule-set and a second rule-set; automated recognizing all possible combinations of values in the first and the second rule-sets; automated verifying each combination of values in the second rule-set against the first rule-set; calculating one or more values characterizing the differences in allowable and rejectable traffic in the first rule-set and the second rule-set; automated comparing the calculated values and/or derivatives thereof with a predefined threshold; and automated classifying the relationship between the first rule-set and the second rule-set in accordance with comparison results.

If the second rule-set further comprises extra allowable traffic resulting from amending the first rule set, the method further comprises: obtaining a connectivity request; automated recognizing all possible combinations of values in the connectivity request; automated verifying each combination of values in the connectivity request against the first rule-set and the second rule-set; calculating one or more values selected from a group comprising values characterizing relative amount of extra allowed traffic and values characterizing relative amount of dissatisfied traffic in the connectivity request; automated comparing the calculated values and/or derivatives thereof with a predefined threshold; and automated classifying, in accordance with comparison results, the second rule-set with regard to the connectivity request.

In accordance with other aspects of the subject matter of the present application, there is provided a system capable of automated managing a security rule-set. The system comprises: means for obtaining data characterizing a first rule-set and a second rule-set; means for automated recognizing all possible combinations of values in the first and the second rule-sets; means for automated verifying each combination of values in the second rule-set against the first rule-set; means for calculating one or more values characterizing the differences in allowable and rejectable traffic in the first rule-set and the second rule-set; means for automated comparing the calculated values and/or derivatives thereof with a predefined threshold; and means for automated classifying the relationship between the first rule-set and the second rule-set in accordance with comparison results.

If the second rule-set comprises extra allowable traffic resulting from amending the first rule set, the system further comprises: means for obtaining a connectivity request; means for automated recognizing all possible combinations of values in the connectivity request; means for automated verifying each combination of values in the connectivity request against the first rule-set and the second rule-set; means for calculating one or more values selected from a group comprising values characterizing relative amount of extra allowed traffic and values characterizing relative amount of dissatisfied traffic in the connectivity request; means for automated comparing the calculated values and/or derivatives thereof with a predefined threshold; and means for automated classifying, in accordance with comparison results, the second rule-set with regard to the connectivity request.

In all aspects of the subject matter of the present application at least one value characterizing relative amount of extra allowed traffic may be selected from a group comprising values characterizing a relation between allowed traffic in the second rule-set and traffic allowed in the first rule-set; values characterizing a relation between entire added traffic and traffic which needs to be added in accordance with the connectivity request; and values characterizing a relation between allowed traffic that has not been requested and traffic allowed in the first rule-set.

In all aspects of the subject matter of the present application at least one value characterizing relative amount of dissatisfied requested traffic may be selected from a group comprising: values characterizing a relation between requested traffic dissatisfied resulting from amendment and requested traffic satisfied resulting from the amendment; values characterizing a relation between requested traffic dissatisfied resulting from the amendment and entire requested traffic; and values characterizing a relation between requested traffic dissatisfied resulting from the amendment and requested traffic dissatisfied before the amendment.

BRIEF DESCRIPTION OF THE DRAWINGS

In order to understand the invention and to see how it may be carried out in practice, an embodiment will now be described, by way of non-limiting example only, with reference to the accompanying drawings, in which:

FIGS. 5a and 5b illustrate exemplary screenshots of a generated verification report in accordance with certain embodiments of the present invention;

DETAILED DESCRIPTION OF EXEMPLARY EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "modifying", "calculating", "determining", "generating", "configuring", "searching", "finding", or the like, refer to the action and/or processes of a computer that manipulate and/or transform data into other data, said data represented as physical, such as electronic, quantities and/or such data represent one or more physical objects.

The term "computer" should be expansively construed to cover any kind of electronic device with data processing capabilities. The operations in accordance with the teachings herein may be performed by a computer specially constructed for the desired purposes or by a general-purpose computer specially configured for the desired purpose by a computer program stored in a computer readable storage medium.

The term "criterion" used in this patent specification should be expansively construed to include any compound criterion, including, for example, several criteria and/or their logical combinations.

The references cited in the background teach many principles of security management that are applicable to the present invention. Therefore the full contents of these publications are incorporated by reference herein where appropriate for appropriate teachings of additional or alternative details, features and/or technical background.

Figure 1:
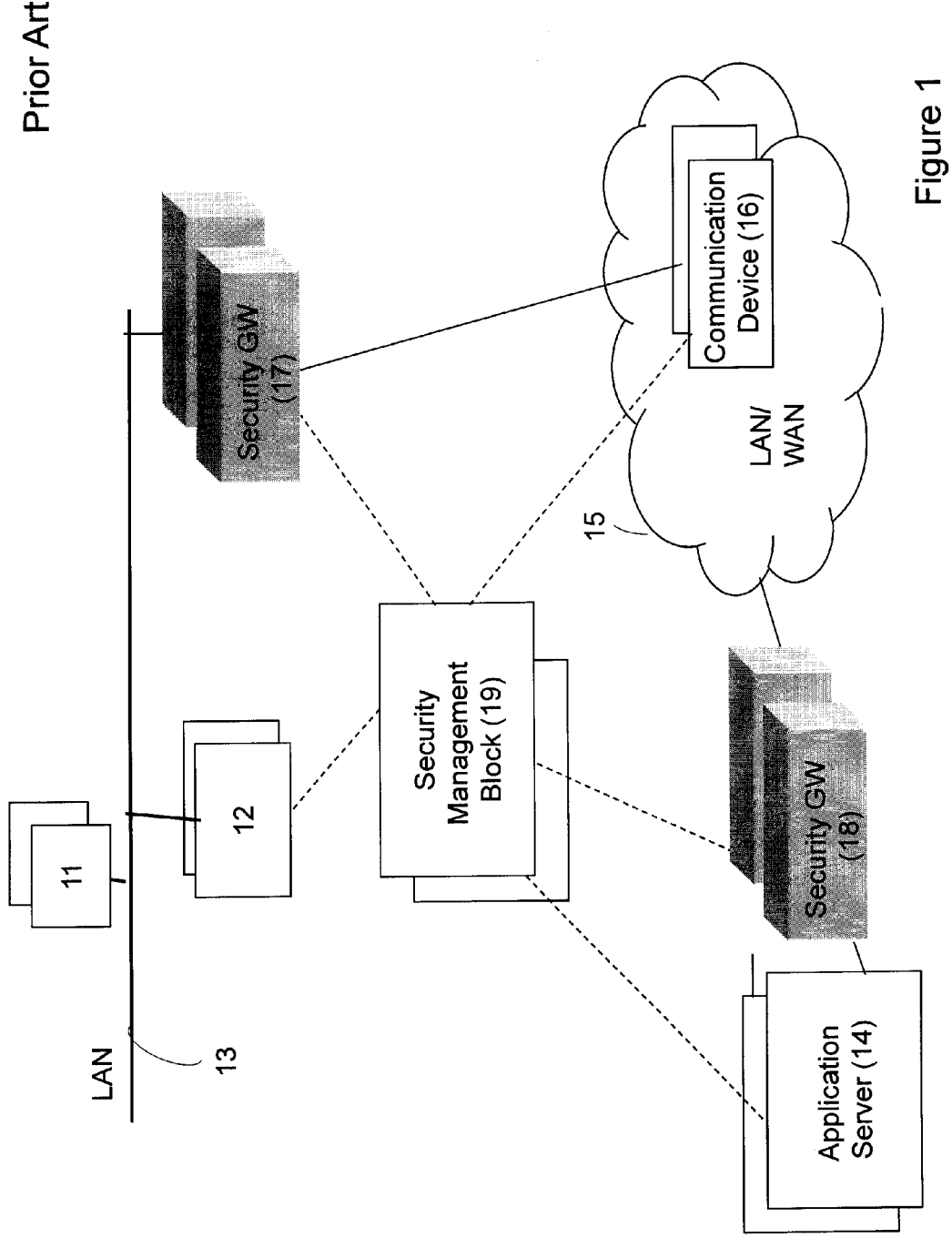
FIG. 1 illustrates a generalized network environment where the present invention may be implemented.

Bearing the above in mind, attention is drawn to FIG. 1 schematically illustrating an exemplary network environment wherein the present invention may be implemented. The network environment comprises a plurality of network resources, e.g. workstations 11 and/or servers 12, application servers 14 (and/or others not shown remote network resources as, for example, remote hosts, etc.). The network resources may be operatively connected via one or more local (13) and/or wide area (15) communication networks (including Internet). A communication network comprises one or more communication devices 16 (e.g. switches, routers, bridges, etc.) facilitating the data transfer. The network environment further comprises one or more security gateways. In the illustrated non-limiting example security gateway 17 is operatively connected to the private network 13 and to the wide area network 15 and controls inbound and outbound traffic related to the private network and resources thereof; security gateway 18 is operatively connected to the application servers 14 and to the wide area network 15 and controls the respective traffic. The security gateway may comprise, for example, one or more routers or firewalls with respective load balancers, intrusion detection/prevention systems, VPN devices and/or other equipment facilitating network and/or application security.

The security gateways operate in accordance with one or more rules controlling, at least, inbound and/or outbound traffic with regard to respective resources. These rules (including combinations and/or hierarchies thereof) are referred to hereinafter as a rule-set. A single rule typically includes several fields (e.g. source (IP address and/or port), destination (IP address and/or port), service type, user, application, etc.), and an action which shall be drawn from the rule when a certain condition with regard to the field values is satisfied. The fields included in such condition(s) are referred to hereinafter as "fields engaged in the rules". A field may be characterized by a specified set of values (e.g. a certain IP address, a certain range of TCP ports, a certain range of IP addresses in a LAN defined by a mask, any port, etc.). The action in the rule may specify accepting or denying the respective traffic, authentication, encryption, etc.

The security gateways are operatively connected to a security management block 19. The security management block may be fully or partly integrated with one or more security gateways and/or with other network resources, or may be implemented in one or more stand-alone servers. The functions of security management block may include providing a backend for the policy editor GUI, monitoring the operation of the security gateways, storing the rule-set database and log database, reporting, etc.

Note that the invention is not bound by the specific architecture described with reference to FIG. 1. Those versed in the art will readily appreciate that the invention is, likewise, applicable to any network architecture facilitating protection of data network resources in accordance with a rule-set installed at any suitable security gateway capable of controlling the respective traffic.

Figure 2:
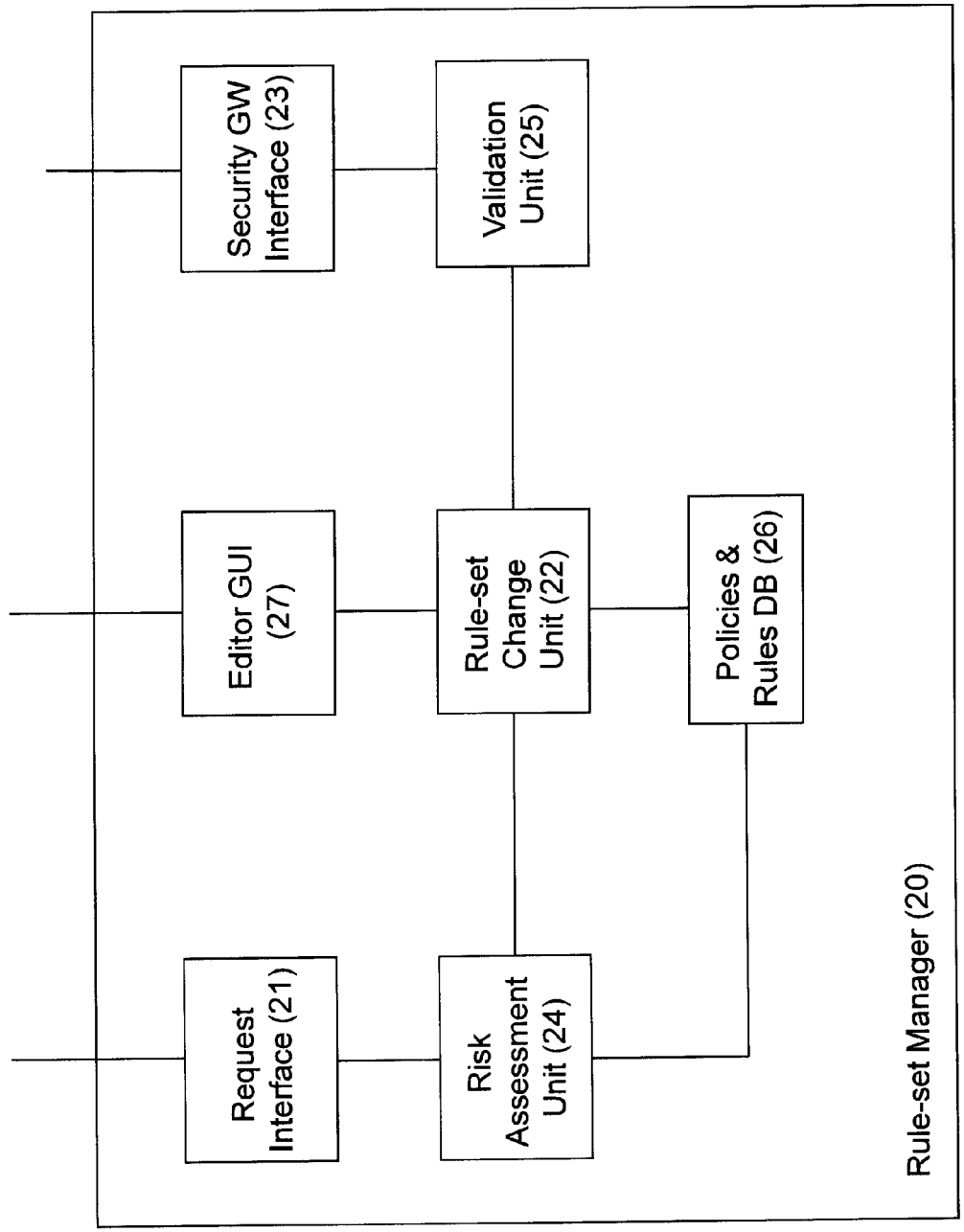
FIG. 2 illustrates a generalized functional diagram of a rule-set manager in accordance with certain embodiments of the present invention.

FIG. 2 illustrates a generalized functional diagram of a rule-set manager. In accordance with certain embodiments of the invention, there is provided a rule-set manager configured to verify a connectivity request against a certain rule-set implemented (or desired to be implemented) on certain security gateway(s). Alternatively or additionally, the rule-set manager is configured to analyze the difference between two different rule-sets implemented (or desired to be implemented) on different security gateways and/or between two different rule-sets in a case when one rule-set is a derivative of another rule-set amended per a certain connectivity request.

The rule-set manager 20 comprises a request interface 21 configured to obtain data characterizing a connectivity request. Some connectivity requests may be fully accepted by an existing rule-set referred to hereinafter as "initial rule-set"; while other connectivity requests may become fully or partly satisfied only upon changes of the initial rule-set (such requests are referred to hereinafter as "unfitting requests").

For purpose of illustration only, the following description is made with respect to acceptance of connectivity requests requesting allowance of certain traffic. Those skilled in the art will readily appreciate that the teachings of the present invention are applicable in a similar manner to acceptance of connectivity requests alternatively or additionally requesting dropping of certain traffic or other actions.

The connectivity requests may be received by the rule-set manager from a client (human user and/or application) for further analyses and/or respective rule-set amending.

The request interface is operatively connected to a rule-set change unit 22. As was detailed in U.S. patent application Ser. No. 12/781,352 filed on May 17, 2010 assigned to the assignee of the present invention and incorporated herein by reference in its entirety, the rule-set change unit is operable to process the obtained data characterizing a given unfitting connectivity request, generate amendments to the initial rule-set, and to provide the generated amendments to respective security gateway (and/or security management block) via a security gateway interface 23. Likewise, the generated amendments may be provided to another device involved in policy management or to an administrator.

Validation unit 25 is operatively connected to the request interface 21, policies and rules database 26 and/or security gateway interface 23, and, optionally, to the rule-set change unit 22 and to a risk assessment unit 24. Optionally, the rule-set manager may further comprise editor GUI 27 operatively connected to the validation unit 25. Functions of the units are further detailed with reference to FIGS. 4-7.

Those versed in the art will readily appreciate that the rule-set manager may be fully or partly integrated with the security gateway and/or the security management block and/or with other devices (e.g. communication devices, security devices, etc.), or may be implemented as a stand-alone entity, optionally connected to the security gateway.

Figure 3A:
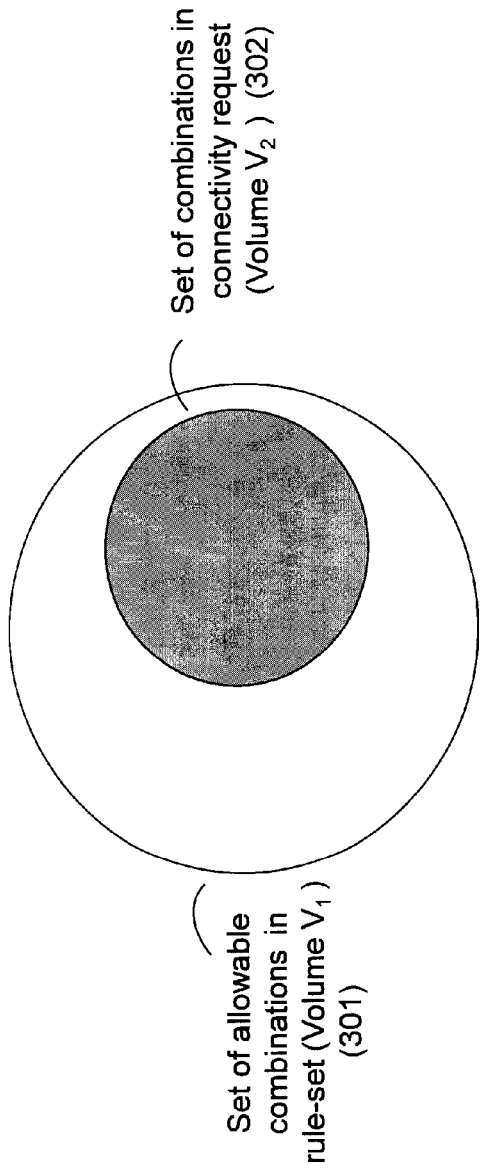
FIGS. 3a and 3b schematically illustrate the relationship between allowed traffic in the initial rule-sets and a connectivity request.
Figure 3B:
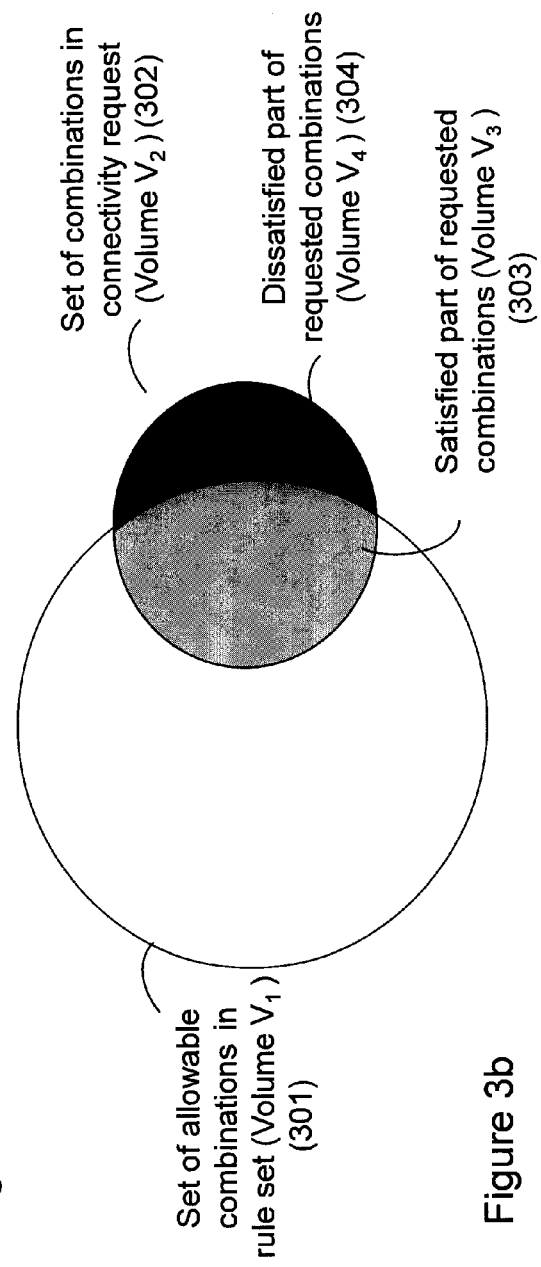

Referring to FIGS. 3a and 3b, there is schematically illustrated the relationship between allowed traffic in a rule-set and in a connectivity request.

A circle 301 represents a set of allowable values of a given initial rule-set. Values specified in the fields (e.g. addresses and services) are referred to hereinafter as "allowable" if they are connected by an allowance condition and not shadowed by previous rules, (e.g. a previous rule should not perform contradicting actions on the required connectivity). The set 301 is characterized by volume $V_1$ which is calculated over the initial rule-set and characterizes a number of allowable combinations. By way of non-limiting example, rule-set allowable volume may be calculated for a rule-set with a prioritized order of rules (referred to hereinafter as an ordered rule-set) as follows:

a) Calculate un-shadowed volume for each permissive rule in the rule-set. This volume may be calculated by summing/counting the number of unique conditions available in the rule, that do not exist in previous rules, i.e. the number of unique combinations of the form "Src IP×Dst IP×Service", that will be matched to the given rule.

a) Calculate rule-set allowable volume by accumulating un-shadowed volume for each individual permissive rule.

A circle 302 represents a set of values specified in a given connectivity request. The request is characterized by volume $V_2$ which characterizes a number of requested combinations and may be, by way of non-limiting example, calculated as a multiplication of a number of IP addresses in a source field with a number of allowable IP addresses in a destination field and a number of services in a service field of the connectivity request.

FIG. 3a illustrates a case where the entire connectivity request is satisfied by the initial rule-set. FIG. 3b illustrates an unfitting connectivity request where the gray part 303 (characterized by volume $V_3$) represents an intersection of sets 301 and 302, i.e. a part of connectivity request satisfied in the initial rule-set; and the black part 304 (characterized by volume $V_4$) represents a complement of the set 302 relative to set 301, i.e. a part of the connectivity request dissatisfied in the initial rule-set. Volumes $V_3$ and $V_4$ may be calculated similar to Volume $V_2$ for satisfied and dissatisfied combinations, accordingly.

Figure 4:
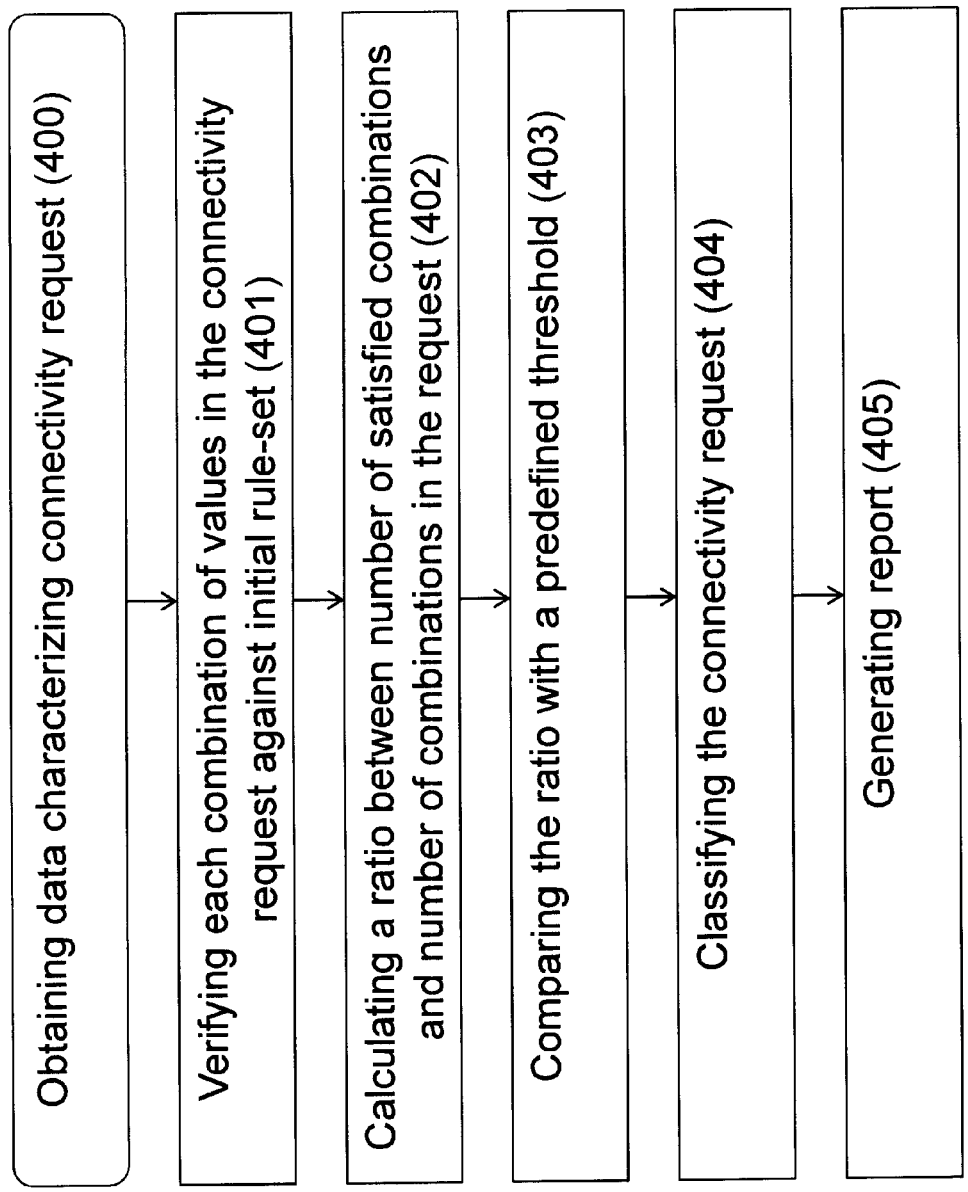
FIG. 4 illustrates a generalized flow diagram of verifying a connectivity request against a rule-set in accordance with certain embodiments of the present invention.

Referring to FIG. 4, there is illustrated a generalized flow diagram of verifying a connectivity request against a rule-set in accordance with certain embodiments of the present invention. Responsive to obtaining (400) data characterizing a connectivity request, the validation unit recognizes all possible combinations of values in the connectivity request and verifies (401) each combination against the initial rule-set, i.e. checks for each combination if it matches (satisfying combination) or does not match (dissatisfying combination) to respective value(s) specified in the fields engaged in respective rule(s) in the initial rule-set (for example source IP address or subnet, destination IP address or subnet, service or port, action (e.g. allow, drop, reject etc.), VPN and encryption requirements, time window(s) to enforce, authentication, allowable application, etc.). The verification also takes in account possible shadowing by previous rules. The connectivity request can be simple (for example: connect host A to host B) or more complex (e.g. request of multiple access paths). Optionally, a complex connectivity request may be split into respective composites, and verification may be provided separately for each composite as further illustrated in Table 1. Likewise, verification may be provided to a bulk of connectivity requests.

The initial rule-set may be obtained by the validation unit 25 from security gateway(s) and/or security management block via the security gateway interface 23. Additionally or alternatively, the initial rule-set may be handled in the policy & rules database 26 of the rule-set manager.

The validation unit further calculates (402) a value characterizing relative amount of satisfied and dissatisfied combinations in the request; and compares (403) this value with a predefined threshold. If the value matches the predefined threshold, the rule-set manager classifies (404) the request as verified. By way of non-limiting example, the value may be calculated as a ratio between number of satisfied combinations (Volume $V_3$ as illustrated in FIG. 3) and number of combinations in the connectivity request (Volume $V_2$ as illustrated in FIG. 3).

By way of non-limiting example, the exemplary connectivity request is defined as:

Source: 10.0.0.0/24
Destination: 192.168.1.40 and 192.168.1.41
Destination ports: 80 and 8080
Action: Accept In a case of initial rule-set when for all sources in the range (10.0.0.0/24) and for both destinations port 80 is opened and port 8080 is not, the calculated ratio is 50%.

In a case of initial rule-set when for all sources in the range (10.0.0.0/24) and for both ports, one destination is opened and the other not, the calculated ratio is 50%.

In a case of initial rule-set when for all sources in the range (10.0.0.0/24) only one port and one destination is opened and the others not, the calculated ratio is 25%.

In a case of initial rule-set when only for 10 IP addresses in the source range are blocked, and all destinations and ports are open for the rest of IP addresses, the calculated ratio is 246/256*100~96%.

A non-limiting example of verification results of the above exemplary connectivity request, in a case of some exemplary initial rule-set, is illustrated in Table 1. The example is provided for the threshold predefined as a minimal ratio between number of satisfied combinations and number of combinations in the connectivity request equal to 80%. Verification has been provided separately for each sub-request 1-4, and verification results include calculated ratio, classification decision (verified/non-verified status), and engaged satisfied and conflicting rules.

TABLE 1

| Sub-requests | Source | Destination | Destination port | Status | % | Satisfying Rules | Conflicting rules |
|---|---|---|---|---|---|---|---|
| 1 | 10.0.0.0/24 | 192.168.1.40 | 80 | Verified | 100% | #10, #40 | |
| 2 | 10.0.0.0/24 | 192.168.1.41 | 80 | Verified | 80% | #15 | #20 |
| 3 | 10.0.0.0/24 | 192.168.1.40 | 8080 | Non-verified | 20% | #3 | #71, #73 |
| 4 | 10.0.0.0/24 | 192.168.1.41 | 8080 | Non-verified | 0% | | Clean-up rule |

The verification results may be used for automatically handling the request (for example to close a respective ticket) and/or may be presented to the user for manual handling. Optionally, the rule-set manager generates (405) a verification report which may be exported to another device or be presented to a user via the editor GUI 27. An exemplary screenshot of the verification report is illustrated in FIGS. 5*a* and 5*b*.

Optionally, verification of a connectivity request may further include testing against various policies or databases provided with the help of the risk assessment unit 24. By way of non-limiting example, such policies may include:

Destination security policies on target devices—if the connectivity requirement is explicitly denied, this may indicate a risk;

Risk policies—connections that pose a certain risk or zones that should not be connected;

Business continuity policies—connections that are essential and must not be broken;

Compliance policies—configurations which are to be avoided (for example, unencrypted protocols to PCI devices or the use of certain applications)

Best practices—configurations which are best performed in a certain way (for example, avoiding network object duplication);

Vulnerability databases—information concerning vulnerable assets that could be exposed by the requested connectivity change;

Malicious agents—information regarding hosts/users/applications or other entities that may acquire access by the requested connectivity change.

Policies can be manually configured, imported from other systems and/or learned from previous decisions. Policies may be handled in the security gateway and/or policy and rules database 26 and/or otherwise.

The verification process may be provided at various time points as, for example, before and/or after amending the initial rule-set, before and/or after pushing out the amendment rule-set to security gateway, etc.

Figure 6:
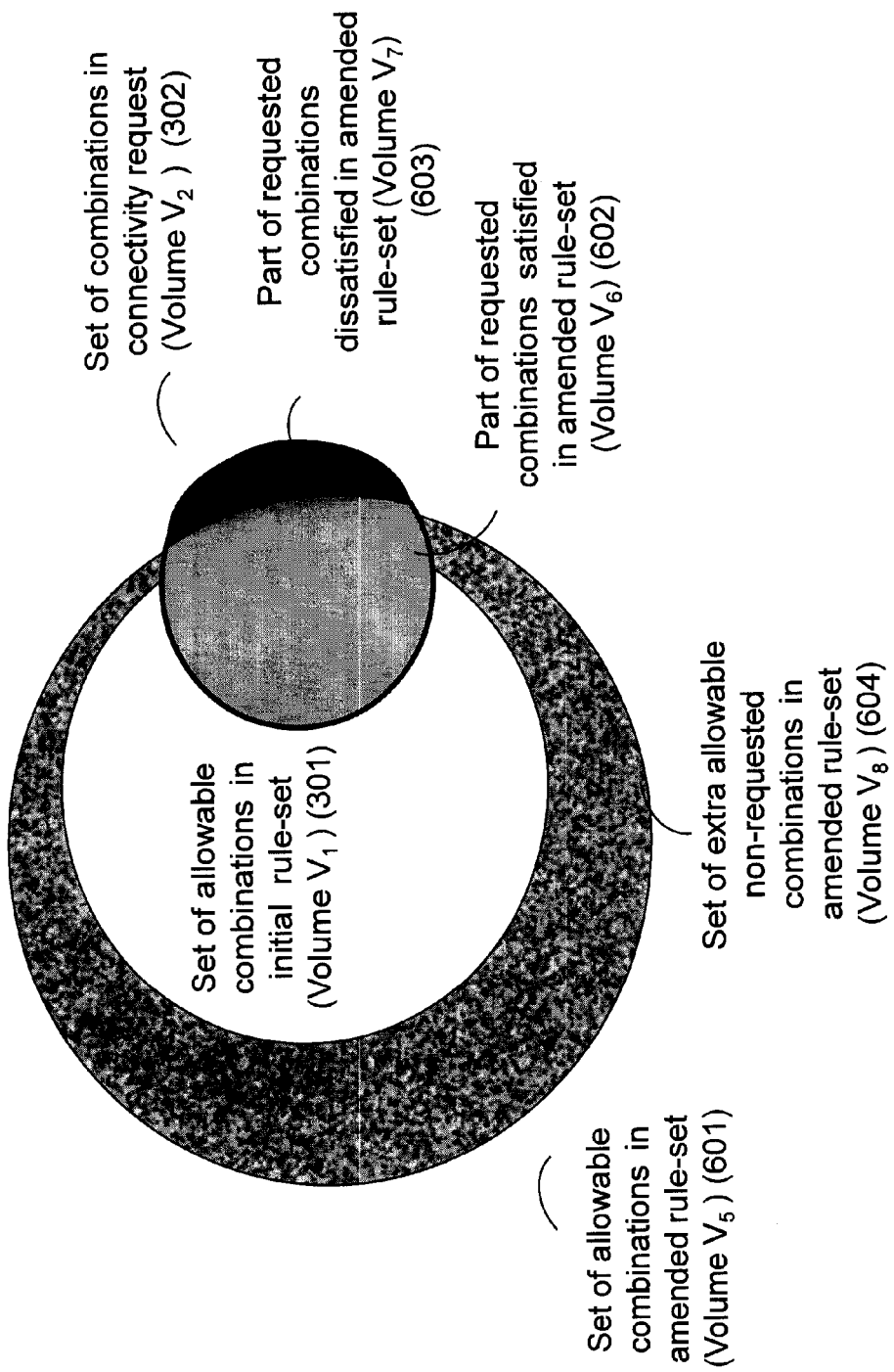
FIG. 6 schematically illustrates the relationship between allowed traffic in the initial rule-set, a connectivity request and allowed traffic in the amended rule-set.

Referring to FIG. 6, there is schematically illustrated the relationship between allowed traffic in an initial rule-set, a connectivity request, and amended (e.g. for better fitting to the connectivity request) initial rule-set referred to hereinafter as amended rule-set.

Similar to FIGS. 3*a* and 3*b*, the circle 301 represents a set of allowable values of a given initial rule-set and is characterized by volume $V_1$. The circle 302 represents a set of values specified in a given connectivity request and is characterized by volume $V_2$. The large circle 601 represents a set of allowable values of an amended rule-set and is characterized by volume $V_5$. The gray part 602 (characterized by volume $V_6$) of the circle 302 represents the intersection of sets 601 and 302, i.e. a part of connectivity request satisfied in the amended rule-set. Those versed in the art will readily appreciate that, resulting from the amendment, part of the traffic satisfied in the initial rule-set may be dissatisfied in the amended rule-set, for example because of changes to definitions of network objects that appear in multiple rules. The black part 603 (characterized by volume $V_7$) of circle 302 represents a complement of the set 302 relative to set 601, i.e. a part of connectivity request dissatisfied in the amended rule-set, for example because of changes to definitions of network objects that appear in multiple rules. The patterned part 604 (characterized by volume $V_8$) of circle 601 represent traffic allowed upon amendment, wherein not-requested in the connectivity request. Volume $V_5$ may be calculated similar to Volume $V_1$; Volumes $V_6$ and $V_7$ may be calculated similar to Volumes $V_2$, $V_3$, and $V_4$ as was detailed with reference to FIG. 3.

Amending the initial rule-set for better fitting the connectivity request results in an amended rule-set comprising extra allowed traffic, while some traffic, previously allowed in the initial rule-set, becomes restricted (e.g. due to rule and object changes).

Figure 7:
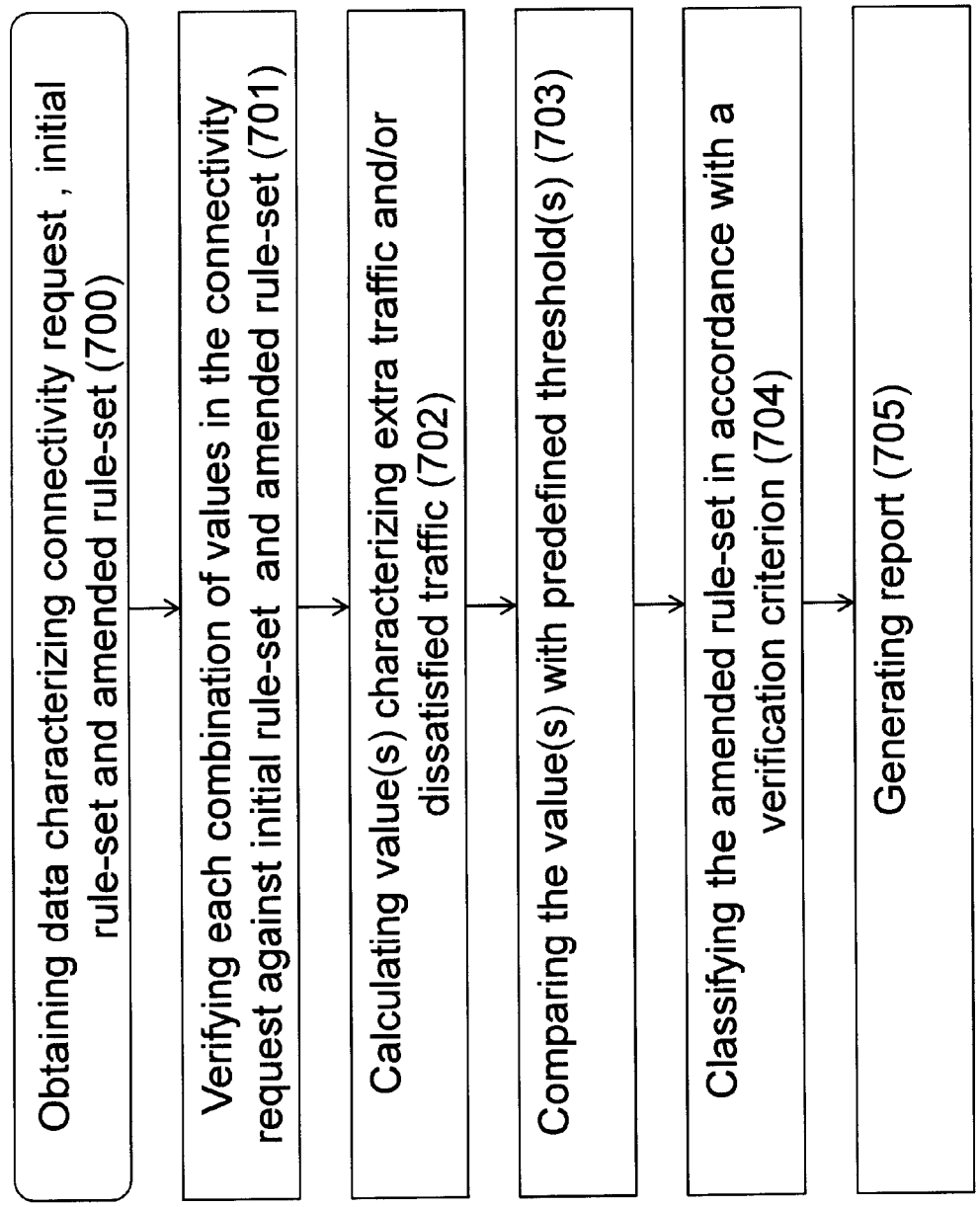
FIG. 7 illustrates a generalized flow diagram of verifying amendments provided to the initial rule-set against a connectivity request in accordance with certain embodiments of the present invention.

Referring to FIG. 7, there is illustrated a generalized flow diagram of verifying, in accordance with certain embodiments of the present invention, amendments provided to the initial rule-set against a connectivity request. The verification is provided in accordance with criteria related to resulting extra traffic allowed in the rule-set and/or resulting dissatisfied traffic in the connectivity request.

In accordance with certain embodiments of the present invention, resulting extra traffic may be characterized by a relative amount of extra-allowed traffic (RAT).

By way of non-limiting example, the relative amount of extra allowed traffic may be characterized by a relation between allowed traffic in the amended rule-set and traffic allowed in the initial rule-set, and may be calculated, for example, as $RAT=V_5/N_1$. By way of another non-limiting example, the relative amount of extra allowed traffic may be characterized by a relation between entire added traffic and traffic which needs to be added in accordance with the connectivity request, and may be calculated, for example, as $RAT=(V_5-V_1)/(V_6-V_3)$ and, accordingly, may characterize. In these examples the minimal and best RAT=1. By way of another non-limiting example, the relative amount of extra-allowed traffic may be characterized by a relation between traffic that has been allowed upon the amendment while has not been requested in the connectivity request and originally allowed traffic. The value may be calculated, for example, as $RAT=V_8/V_1$. In this example the minimal (and best) $RAT=0$.

In accordance with certain embodiments of the present invention, the dissatisfied traffic in the connectivity request may be characterized by relative amount of rejected (dissatisfied) requested traffic (RRT).

By way of non-limiting example, the relative amount of dissatisfied traffic may be characterized by a relation between requested traffic dissatisfied resulting from amendment and requested traffic satisfied resulting from the amendment, and may be calculated, for example, as $RRT=V_7/V_6$. By way of another non-limiting example, the relative amount of dissatisfied traffic may be characterized by a relation between requested traffic dissatisfied resulting from amendment and entire requested traffic, and may be calculated, for example, as $RRT=V_7/V_2$. In these examples the minimal $RRT=0$. By way of another non-limiting example, the relative amount of dissatisfied traffic may be characterized by a relation between requested traffic dissatisfied resulting from amendment and requested traffic dissatisfied before amendment, and may be calculated as $RRT=V_7N_4$.

Responsive to obtaining (700) data characterizing connectivity request, initial rule-set and amended rule-set, the validation unit recognizes all possible combinations of values in the connectivity request and verifies (701) each combination against the initial rule-set and the amended rule-set in a manner detailed with reference to FIG. 4. The validation manager further calculates (702) value(s) characterizing extra traffic and/or dissatisfied traffic, compares (703) the calculated value(s) with predefined threshold(s), and classifies (704) the amended rule-set. The amended rule-set is classified as verified (e.g. applicable for implementation) if the results of comparison match a predefined verification criterion. In certain embodiments of the invention, there may be configured one or more calculated values (e.g. one or more RAT values and/or one or more RRT values, etc.) with corresponding thresholds, and verification criterion may require that each calculated value fits the respective threshold or that certain calculated values and/or certain part of the calculated values fits the respective thresholds. Additionally or alternatively, there may be configured a composite value (e.g. $RAT^2+RRT^2$ or other combination of one or more RAT characteristics and/or one or more RRT characteristics) required to fit respective predefined threshold. Those versed in the art will readily appreciate that the thresholds may define minimal fitting value, maximal fitting value or a range of fitting values.

Likewise, the amended rule-set may be verified with regard to other actions beyond ALLOW and DENY. By way of non-limiting example, if the security gateway supports an action AUTHENTICATE, then the calculated values may be related to at least one of the following differences between the amended rule-set and the initial rule-set:

difference in traffic that is denied in the initial rule-set and allowed in the amended rule-set; difference in traffic that is allowed in the initial rule-set and denied in the amended rule-set;
difference in traffic that is denied in the initial rule-set and authenticated in the amended rule-set;
difference in traffic that is allowed in the initial rule-set and authenticated in the amended rule-set;
difference in traffic that is authenticated in the initial rule-set and allowed in the amended rule-set;
difference in traffic that is authenticated in the initial rule-set and denied in the amended rule-set.

The amended rule-set may be further classified in accordance with additional criteria as, by way of non-limiting example:

minimized traffic rejected resulting the provided amendments;
special treatment of certain rules (e.g. the stealth rule);
minimized changes in the rule-set (change in a single rule is preferred to multiple rule changes; change in a single field (for example Source) is preferred to multiple field changes; etc.);
simplicity of resulting configuration (e.g. minimized number of rules, minimized number of objects, minimized number of objects participating in rule fields, minimized shadowing);
rule-set characteristics (e.g. preserving rule base grouping by certain fields, usage of network groups; minimal and/or maximal allowed network size; maximal number of rules in a certain section);
performance considerations;
best practices,
user preferences, etc.

The verification results may be used to automatically handle the request, be presented to the user in a generated (705) report, etc.

Likewise, the rule-set manager may be configured to verify one or more certain rules in the rule-set against the connectivity request, thereby enabling considering possible side effects related to amending said certain rules.

Figure 8:
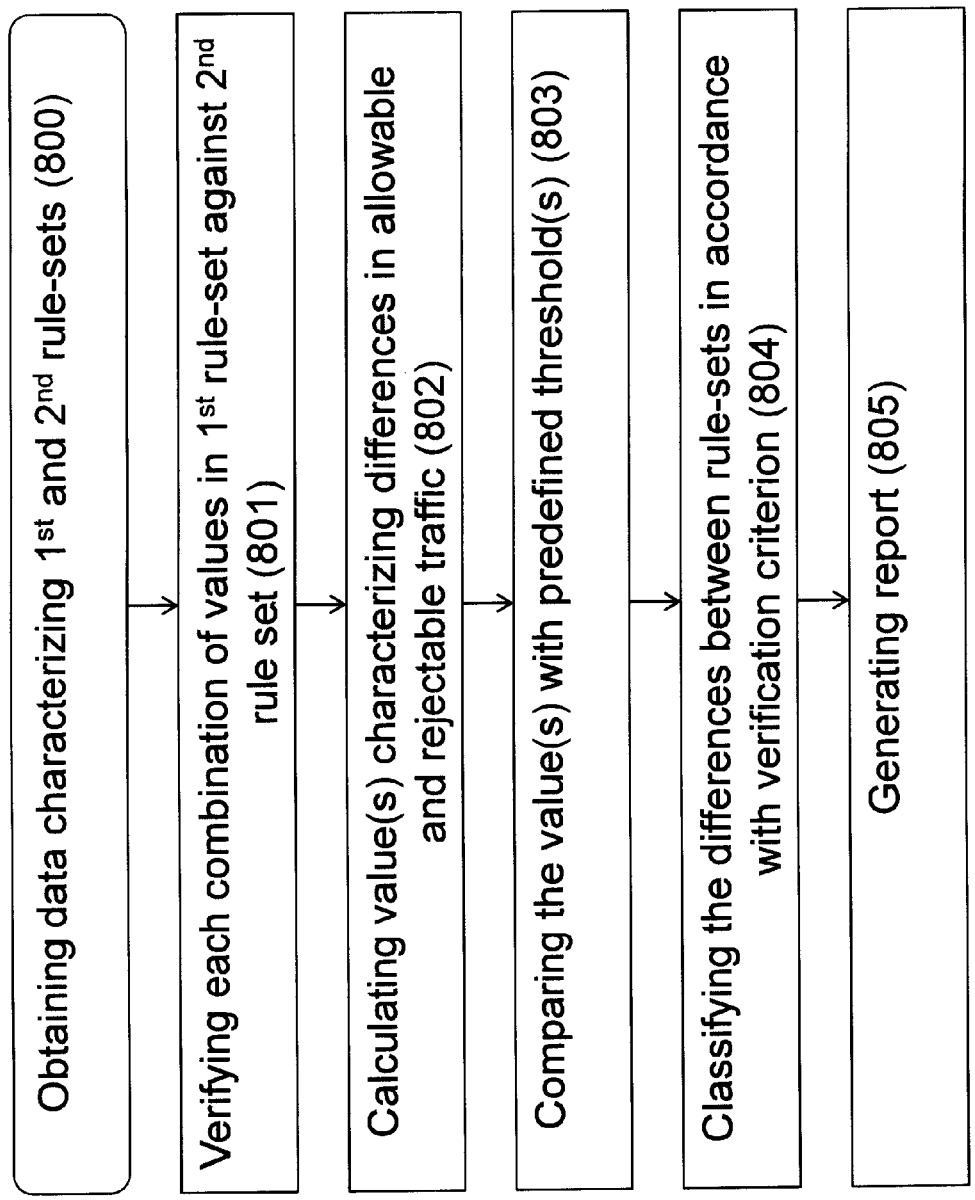
FIG. 8 illustrates a generalized flow diagram of verifying, in accordance with certain embodiments of the present invention, two rule-sets dedicated to the same or to different security gateways.

Referring to FIG. 8, there is illustrated a generalized flow diagram of verifying, in accordance with certain embodiments of the present invention, two rule-sets dedicated to the same or to different security gateways.

Responsive to obtaining (800) data characterizing a first and a second rule-sets the validation unit recognizes all possible combinations of values both sets and verifies (801) each combination in one rule-set against respective combination in another rule-set in a manner detailed with reference to FIG. 4. The validation manager further calculates (802) value(s) characterizing differences in allowable and rejectable traffic, compares (803) the calculated value(s) with predefined threshold(s), and classifies (804) the relationship between the rule-sets. Similar to the procedure detailed with reference to FIG. 7, the relationship between the rule-sets is classified as verified (e.g. rule-sets are considered as replaceable) if the results of the comparison match a predefined verification criterion. The verification results may be used, for example, to automatically allow implementation of respective rule-set(s), perform an access regression test before installing a new policy, verify access flows that traverse multiple gateways, verify a policy migration from one device to another, be presented to the user in a generated (805) report, etc.

A non-limiting example of respective verification report is illustrated in the following Table 2.

TABLE 2

| | Associated rules in new policy | Status |
|---|---|---|
| Allowing rules in original policy | | |
| 14 | 14 | The same traffic is allowed by this rule in both policies |
| Denying rules in original policy | | |
| Cleanup | 11 | Part of denied traffic by cleanup rule is now allowed by rule 11 |
| Cleanup | 15 | Part of denied traffic by cleanup rule is now allowed by rule 15 |

TABLE 2-continued

| | | |
|---|---|---|
| Cleanup | Cleanup | Part of denied traffic by cleanup rule is still denied by the cleanup rule |

| Associated rules in original policy | | Status |
|---|---|---|
| Allowing rules in new policy | | |
| 11 | Cleanup | The allowed traffic by rule 11 was previously denied by cleanup rule |
| 14 | 14 | The same traffic is allowed by this rule |
| 15 | Cleanup | The allowed traffic by rule 15 was previously denied by cleanup rule |
| Denying rules in new policy | | |
| Cleanup | Cleanup | The denied traffic by cleanup rule was previously denied by the cleanup rule |

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present invention.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of automatically managing one or more security rule-sets, the method comprising:
    a. obtaining data characterizing a connectivity request and data characterizing an amended rule-set, the amended rule-set being derivative of an initial rule-set amended to fit the connectivity request;
    b. automatically verifying each possible combination of values specified in different fields of the connectivity request against the initial rule-set and the amended rule-set;
    c. calculating one or more values corresponding to an amount of extra allowed traffic or an amount of dissatisfied requested traffic;
    d. automatically comparing the calculated values with a predefined threshold; and
    e. automatically classifying the amended rule-set as appropriate for implementation if the results of the automatically comparing match a predefined verification criterion.

2. The method of claim 1 wherein at least one value corresponding to the amount of extra allowed traffic is selected from a group consisting of:
    a. values characterizing a relation between allowed traffic in the amended rule-set and traffic allowed in the initial rule-set;
    b. values characterizing a relation between entire added traffic and traffic which needs to be added in accordance with the connectivity request; and
    c. values characterizing a relation between allowed traffic that has not been requested and traffic allowed in the initial rule-set.

3. The method of claim 1 wherein at least one value corresponding to the amount of dissatisfied requested traffic is selected from a group consisting of:
    a. values characterizing a relation between requested traffic dissatisfied resulting from amendment and requested traffic satisfied resulting from the amendment;
    b. values characterizing a relation between requested traffic dissatisfied resulting from the amendment and entire requested traffic; and
    c. values characterizing a relation between requested traffic dissatisfied resulting from the amendment and requested traffic dissatisfied before the amendment.

4. A system capable of automatically managing a security rule-set, the system comprising:
    a. an interface operable to obtain data characterizing a connectivity request;
    b. an interface operable to obtain data characterizing an amended rule-set, the amended rule-set being derivative of an initial rule-set amended to fit the connectivity request;
    c. means for automatically verifying each possible combination of values specified in different fields of the connectivity request against the initial rule-set and the amended rule-set;
    d. means for calculating one or more values corresponding to an amount of extra allowed traffic or an amount of dissatisfied requested traffic;
    e. means for automatically comparing the calculated values with a predefined threshold; and
    f. means for automatically classifying the amended rule-set as appropriate for implementation if the results of the automatically comparing match a predefined verification criterion.

5. The system of claim 4 wherein at least one value corresponding to the amount of extra allowed traffic is selected from a group consisting of:
    a. value characterizing a relation between allowed traffic in the amended rule-set and traffic allowed in the initial rule-set;
    b. value characterizing a relation between entire added traffic and traffic which needs to be added in accordance with the connectivity request; and
    c. value characterizing a relation between allowed traffic that has not been requested and traffic allowed in the initial rule-set.

6. The system of claim 4 wherein at least one value corresponding to the amount of dissatisfied requested traffic is selected from a group consisting of:
    a. value characterizing a relation between requested traffic dissatisfied resulting from amendment and requested traffic satisfied resulting from the amendment;
    b. value characterizing a relation between requested traffic dissatisfied resulting from the amendment and entire requested traffic; and c. value characterizing a relation between requested traffic dissatisfied resulting from the amendment and requested traffic dissatisfied before the amendment.

7. A method of automatically managing one or more security rule-sets, the method comprising:
   a. obtaining data characterizing a connectivity request and data characterizing one or more rules in an amended rule-set, the one or more rules in the amended rule-set being derivatives of corresponding one or more rules in an initial rule-set amended to fit the connectivity request;
   b. automatically verifying each possible combination of values specified in different fields of the connectivity request against the one or more rules in the amended rule-set and against the corresponding one or more rules in the initial rule-set;
   c. calculating one or more values corresponding to an amount of extra allowed traffic or an amount of dissatisfied requested traffic;
   d. comparing the calculated values with a predefined threshold; and
   e. automatically classifying the one or more rules in the amended rule-set as inappropriate for implementation if the results of the comparing do not match a predefined verification criterion.

8. The method of claim 7 wherein at least one value corresponding to the amount of extra allowed traffic is selected from a group consisting of:
   a. values characterizing a relation between allowed traffic in the one or more rules in the amended rule-set and traffic allowed in the corresponding one or more rules in the initial rule-set;
   b. values characterizing a relation between traffic added in the one or more rules in the amended rule-set and traffic which needs to be added in accordance with the connectivity request; and
   c. values characterizing a relation between traffic allowed in the one or more rules in the amended rule-set that has not been requested and traffic allowed in the one or more rules in the initial rule-set.

9. The method of claim 7 wherein at least one value corresponding to the amount of dissatisfied requested traffic is selected from a group consisting of:
   a. values characterizing a relation between requested traffic dissatisfied resulting from amendment and requested traffic satisfied resulting from the amendment;
   b. values characterizing a relation between requested traffic dissatisfied resulting from the amendment and entire requested traffic; and
   c. values characterizing a relation between requested traffic dissatisfied resulting from the amendment and requested traffic dissatisfied before the amendment.

10. A computer program product embodied on a non-transitory computer readable medium and comprising computer program code means for performing all the steps of claim 1 when run on a computer.

* * * * *